United States Patent
Levchenko et al.

(10) Patent No.: US 9,864,626 B2
(45) Date of Patent: *Jan. 9, 2018

(54) COORDINATING JOINT OPERATION OF MULTIPLE HYPERVISORS IN A COMPUTER SYSTEM

(71) Applicant: AO KASPERSKY LAB, Moscow (RU)

(72) Inventors: Vyacheslav I. Levchenko, St. Petersburg (RU); Igor Y. Kumagin, Nizhny Novgorod (RU)

(73) Assignee: AO KASPERSKY LAB, Moscow (RU)

( * ) Notice: Subject to any disclaimer, the term of this patent is extended or adjusted under 35 U.S.C. 154(b) by 0 days.

This patent is subject to a terminal disclaimer.

(21) Appl. No.: 15/062,861

(22) Filed: Mar. 7, 2016

(65) Prior Publication Data

US 2016/0274931 A1   Sep. 22, 2016

Related U.S. Application Data

(63) Continuation of application No. 14/659,049, filed on Mar. 16, 2015, now Pat. No. 9,286,105.

(51) Int. Cl.
*G06F 9/46* (2006.01)
*G06F 9/455* (2006.01)

(52) U.S. Cl.
CPC ............... *G06F 9/45558* (2013.01); *G06F 2009/45562* (2013.01); *G06F 2009/45575* (2013.01); *G06F 2009/45587* (2013.01)

(58) Field of Classification Search
CPC ....... G06F 9/45558; G06F 2009/45575; G06F 2009/45562; G06F 2009/45587
See application file for complete search history.

(56) References Cited

U.S. PATENT DOCUMENTS

| 6,625,751 B1 | 9/2003 | Starovic et al. |
| 7,552,426 B2 | 6/2009 | Traut |
| 7,802,110 B2 | 9/2010 | Morais |

(Continued)

FOREIGN PATENT DOCUMENTS

RU    2445686    3/2012

OTHER PUBLICATIONS

Yang et al., "Understanding the Effects of Hypervisor I/O Scheduling for Virtual Machine Performance Interference", The George Washington University. 2012.

(Continued)

*Primary Examiner* — Camquy Truong
(74) *Attorney, Agent, or Firm* — Patterson Thuente Pedersen, P.A.

(57) ABSTRACT

In a computer system, joint operation of multiple hypervisors is coordinated. A persistent hypervisor and a non-persistent hypervisor are executed. The non-persistent hypervisor is executed in the supervisor mode according to an operating regime controlled by a scheduler engine, and the persistent hypervisor is executed in the hypervisor mode under the control of a handler engine. The handler engine monitors, and responds, to an attempted mode transition of the processor between the hypervisor and supervisor modes, and coordinates the suspension and resumption, as appropriate, of the persistent hypervisor.

19 Claims, 5 Drawing Sheets

(56) References Cited

U.S. PATENT DOCUMENTS

| | | |
|---|---|---|
| 8,010,763 B2 | 8/2011 | Armstrong et al. |
| 8,275,971 B2 | 9/2012 | Franke et al. |
| 8,286,161 B2 | 10/2012 | Togawa et al. |
| 8,321,931 B2 | 11/2012 | Zimmer et al. |
| 8,539,484 B1 | 9/2013 | Offer et al. |
| 8,688,953 B2 | 4/2014 | Franke et al. |
| 8,869,265 B2 | 10/2014 | Dang |
| 8,898,666 B2 | 11/2014 | Saito et al. |
| 9,286,105 B1 | 3/2016 | Levchenko et al. |
| 2011/0019531 A1 | 1/2011 | Kim et al. |
| 2011/0066786 A1* | 3/2011 | Colbert ............... G06F 9/45558 711/6 |
| 2011/0072428 A1 | 3/2011 | Day, II et al. |
| 2012/0284732 A1 | 11/2012 | Griglock et al. |
| 2013/0125115 A1 | 5/2013 | Tsirkin et al. |
| 2013/0145363 A1 | 6/2013 | Eidus et al. |
| 2013/0159663 A1* | 6/2013 | Levenglick ......... G06F 12/1036 711/206 |
| 2014/0053022 A1 | 2/2014 | Forgette et al. |
| 2014/0082619 A1 | 3/2014 | Yoshida et al. |

OTHER PUBLICATIONS

Chandramouli, "Security Recommendations for Hypervisor Depolyment", Draft NIST Special Publication 800-125-A. Computer Security Division. Information Technology Laboratory National Institute of Standards and Technology, Oct. 2014.

Johnson., "XEN—The Low-Level Hypervisor", Aug. 2014.

Jeong, "In-depth Overview of x86 Server Virtualization Technology", CUBRID Blog. 2012.

Chubachi et al., "Hypervisor-based Prevention of Persistent Rootkits", University of Tsukuba, Mar. 22-26, 2010.

Application and File History for U.S. Appl. No. 14/659,049, filed Mar. 16, 2015, inventors Levchenko et al.

European Search Report for European Application No. 15163429 mailed Jun. 1, 2016.

Russian Search Report for Russian Application No. 2014151463/08(082467) dated Oct. 28, 2015. English translation not available.

* cited by examiner

COORDINATING JOINT OPERATION OF MULTIPLE HYPERVISORS IN A COMPUTER SYSTEM

FIELD OF THE INVENTION

The invention relates generally to information processing, particularly, computer virtualization technologies. More particularly, the invention relates to joint operation of multiple hypervisors in a computer system.

BACKGROUND OF THE INVENTION

Today's computer systems are seeing an ever-increasing usage of virtualization technology in a variety of applications—whether in large data centers, or in personal computing. Virtualization supports such configurations as running multiple operating systems on a single computer system, maximizing the utilization of available hardware resources. For example, users of personal computers can utilize multiple virtual machines for simultaneous execution of various applications in different operating systems on their single machines. More often, virtualization is found on large-capacity servers, such as those when providing web hosting services.

The operation of virtual machines generally requires the use of a hypervisor, which coordinates the execution of the virtual machines, acting as a manager or dispatcher of virtual machines. Commonly, a hypervisor is also referred to as a virtual machine monitor (VMM).

If a computer system has multiple hypervisors, it becomes necessary to coordinate their operation properly. Joint operation of virtual machine hypervisors is typically provided by their design: when a hypervisor takes control of the computing platform, the processor state (i.e., protection ring) changes temporarily and, after completion of the hypervisor's actions, the processor is returned to its initial state. For example, in a Windows operating system, if several virtual machines from different manufacturers are operated simultaneously, then the scheduler will allocate time for the execution of the hypervisors in the same way as for the usual threads in the operating system (e.g., taking into account the priority of the various threads). The hypervisor code itself completes its execution correctly upon expiry of a certain time quantum; however, it should be noted that this time quantum does not necessarily coincide with a time quantum that was allocated by the OS's scheduler.

In systems where multiple hypervisors are to be used simultaneously, conventional multitasking techniques may not function efficiently and, in the worst case, they may not even function effectively. These problems are further exacerbated when, among the multiple hypervisors, there is a hypervisor that is executed at a higher privilege level than another hypervisor. For instance, in cases where a persistent hypervisor is to be used to execute a critically-important virtual machine, along-side one or more non-persistent hypervisors, conventional multitasking techniques have had difficulty ensuring proper persistent operation for the persistent hypervisor. Another problem is that other conventional hypervisors may not be aware of the presence of the persistent hypervisor and may crash the operating system while trying to preempt the execution on the processor in hypervisor mode. A solution is therefore needed to facilitate effective and efficient simultaneous execution of multiple hypervisors.

SUMMARY OF THE INVENTION

One aspect of the invention is directed to a special-purpose system for coordinating joint operation of multiple hypervisors. The system is a special-purpose machine that includes a computing platform having a processor, data storage, and input/output facilities, the processor being switchable between a hypervisor mode and a supervisor mode, with the hypervisor mode providing a higher privilege level than the supervisor mode. The computing platform contains instructions that, when executed, cause the computing platform to implement a persistent hypervisor and a non-persistent hypervisor, a scheduler engine configured to coordinate operation of the non-persistent hypervisor in the supervisor mode, and a handler engine configured to coordinate operation of the persistent hypervisor in the hypervisor mode.

The handler engine monitors, and responds, to an attempted mode transition of the processor between the hypervisor and supervisor modes. In response to an attempted mode transition from the hypervisor mode to the supervisor mode, the handler engine suspends execution of the persistent hypervisor, including saving of a state of the processor, and transitions the processor to execute the non-persistent hypervisor in the supervisor mode. In response to a conclusion of execution of supervisor-mode instruction, the handler engine suspends execution of the non-persistent hypervisor, including saving of the processor state, and transitions the processor to execute the persistent hypervisor in the hypervisor mode.

BRIEF DESCRIPTION OF THE DRAWINGS

The invention may be more completely understood in consideration of the following detailed description of various embodiments of the invention in connection with the accompanying drawings, in which.

Figure 1:
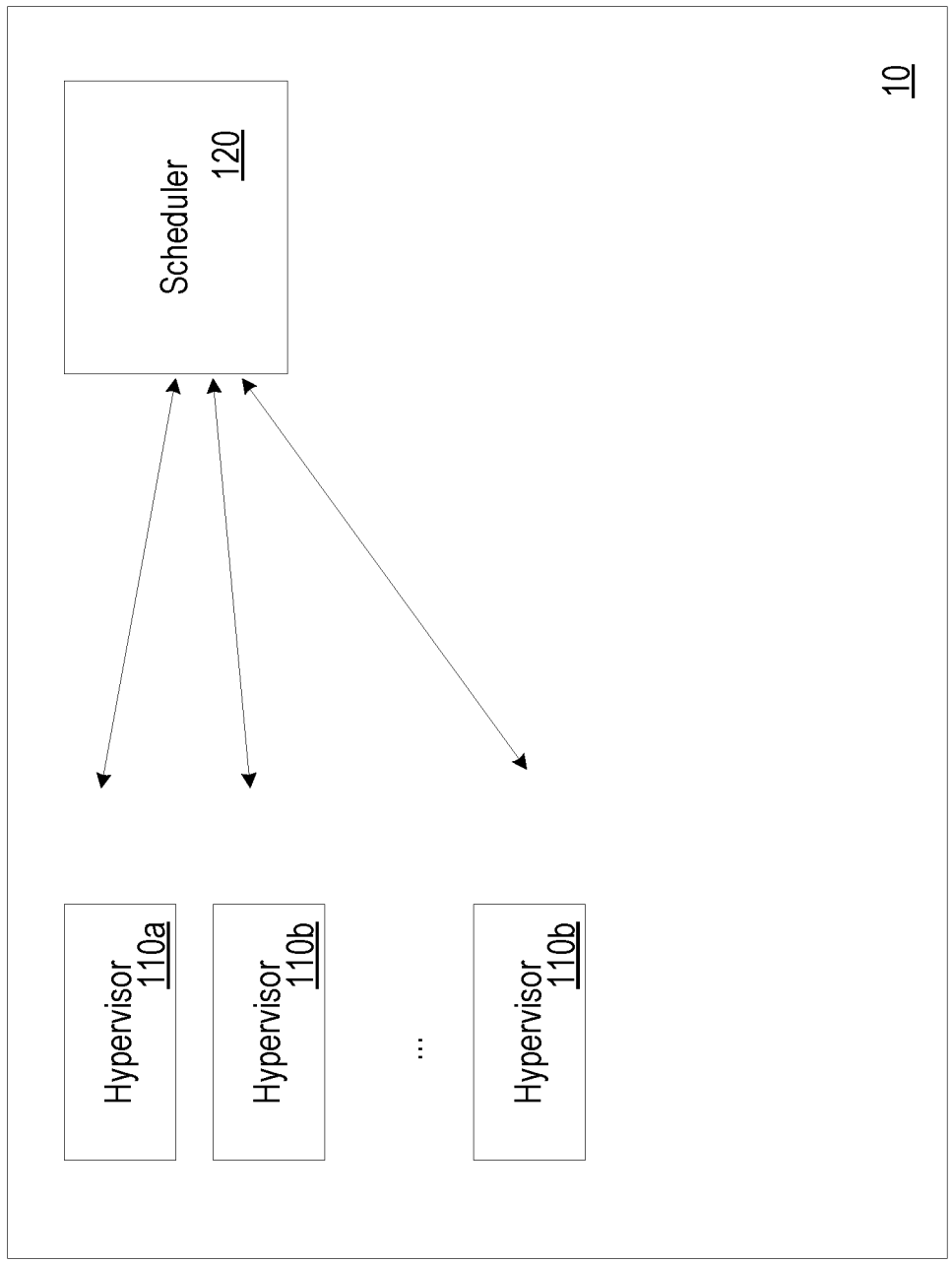
FIG. 1 is a diagram illustrating a portion of a conventional operating system on which a plurality of hypervisors operate, including a persistent hypervisor, and one or more non-persistent hypervisors.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION

I Glossary

The following Glossary sets forth definitions of terms used herein. This Glossary is applicable to only the present application.

"Computing platform," "Computer," and "Computer system"—an electronic device or system of inter-operable electronic devices containing hardware including one or more processors, data storage, input-output devices; and capable of storing and manipulating information according to software instructions carried out by the hardware. It can be one physical machine, or it can be distributed among multiple physical machines, such as by role or function, or by process thread in the case of a cloud computing distributed model. Examples include desktop or mobile personal computers (PCs), smartphones, and tablets, as well as networking devices, such as routers, switches, and the like. Computing platforms can be stand-alone devices, or embedded devices that are part of a larger device or system.

"Data storage"—One or more electronic hardware devices that stores data in a physical storage medium. Examples include volatile storage (e.g., random-access memory (RAM), whether static or dynamic), non-volatile storage (e.g., electrically-erasable programmable read-only memory, magnetic disk, etc.).

"Driver"—An engine or component that acts like a translator between a device, such as a disk drive, and programs that use the device, such as the operating system shell. The driver ordinarily accepts generic commands from a program and then translates them into specialized commands for the device.

"Engine"—A real-world device, component, or arrangement of components implemented using hardware, or as a combination of hardware and software, such as by a microprocessor system and a set of program instructions that adapt the engine to implement the particular functionality, which (while being executed) transform the microprocessor system into a special-purpose device. A engine can also be implemented as a combination of the two, with certain functions facilitated by hardware alone, and other functions facilitated by a combination of software-controlled hardware. In certain implementations, at least a portion, and in some cases, all, of a engine can be executed on the processor(s) of one or more computers that execute an operating system, system programs, and application programs, while also implementing the engine using multitasking, multithreading, distributed (e.g., cluster, peer-peer, cloud, etc.) processing where appropriate, or other such techniques. In addition, a engine can itself be composed of more than one sub-engines, each of which can be regarded as a engine in its own right.

"Hypervisor"—also referred to as a virtual machine monitor (VMM), is a program executable by the processor that coordinates the execution of virtual machines and acts as a manager or dispatcher of virtual machines. A hypervisor presents guest operating systems or system programs with a virtual operating platform and manages the execution of the guest operating systems or system programs. Multiple instances of operating systems or other system software may share the virtualized hardware resources.

"Hypervisor mode"—a processor mode associated with a privilege level even higher than supervisor mode. Hypervisor mode typically provides specialized instructions that facilitate the ability of one or more hypervisors to isolate different operating systems or other system programs, each executing in supervisor mode, from affecting one another. Typically, in systems where supervisor mode is designated as protection ting 0, hypervisor mode is designated as protection ring −1.

"Input/output devices" or "Input/output facilities"—Electronic hardware part of a computer system that facilitate the flow of information into, and out of, the computer system. Examples include a network interface device, a monitor, a keyboard, a mouse, a printer, a serial port, etc.).

"Persistent Hypervisor"—A hypervisor that, in its ordinary course of operation, is expected to be executed as an active, ongoing process of the operating system or other essential program. This persistent operating regime differs from a periodic, or non-persistent regime in which a hypervisor is used occasionally for a specific task, after the conclusion of which the periodic hypervisor can be shut down while the persistent hypervisor remains running. An example of a persistent hypervisor includes a hypervisor requiring ongoing execution of critically-important virtual machines, or a hypervisor required for ensuring the execution of security-related operations such as antivirus processes.

"Processor"—Electronic hardware part of a computer system that carries out the instructions of a computer program by performing basic arithmetical, logical, temporary storage, and input/output operations of the system. Typically, a processor is implemented as a microprocessor (i.e., integrated on a single chip), though this definition includes processor circuits that are implemented on multiple interconnected integrated circuits. Modern-day processors typically include multiple processing cores and can distribute workload among the multiple processing cores.

"Processor mode"—also referred to as "privilege level," is an operating regime for the processor of some computer architectures that selectively places one or more restrictions on the type and scope of operations that can be performed by certain processes being run by the processor. For example, highly-trusted kernel code and, in some cases, highly-trusted drivers or other system programs are allowed to execute in a unrestricted (or a relatively less-restricted) mode referred to as supervisor mode; whereas other processes (including non-supervisory portions of the operating system) execute in a relatively more restricted mode called user mode, and must use a system call to request the more-trusted kernel to perform a restricted operation on its behalf. Processor modes support protection ring architecture.

"Protection ring"—two or more hierarchical levels or layers of privilege within the architecture of a computer system. This is generally hardware-enforced by some architectures that provide different processor modes at the hardware or microcode level. For example, rings have traditionally been arranged in a hierarchy from most privileged (most trusted, usually numbered zero) to least privileged (least trusted, usually with the highest ring number). Typically, ring 0 is the level at which an operating system's kernel executes, and higher-numbered rings are associated with increasingly-restricted privilege levels. Certain contemporary processors support a privilege level even higher than ring 0, referred to as ring −1.

"Supervisor mode"—a processor mode associated with higher-privilege-level processes such as highly-trusted operating system kernel processes and certain highly-trusted drivers. Supervisor mode permits execution of sensitive machine code operations such as modifying registers for various descriptor tables, or performing operations such as disabling interrupts. Supervisor mode may also give access to a restricted address space, to memory management hardware and to certain peripherals that are otherwise inaccessible by user-mode processes.

"System virtual machine"—a virtual machine that provides a complete system platform which supports the execution of a complete operating system. These usually emulate an existing architecture, and are built to provide multiple instances of virtual machines, each of which provides an isolated computing environment. This type of architecture is ubiquitous on servers supporting a cloud computing service, Web hosting, and many other services. System virtual machines can run directly on the hardware of the physical computer system known as a host machine, or over an operating system that runs directly on the host machine (known as operating system-level virtualization). Examples include Windows Virtual PC, VMware, Oracle VM, etc.

"User mode"—a processor mode associated with lower-privilege-level processes such as application programs. User mode prohibits execution of sensitive operations that are capable of changing or destroying data, accessing input/output facilities and peripherals, coordinating execution of various programs, etc. Processes executing in user mode must request higher-privilege-level processes to perform these types of actions on its behalf.

"Virtual machine" is a software-based implementation of a computer system that executes programs like a physical machine using the hardware of a host machine. Virtual machines are separated into two major classifications, based on their use and degree of correspondence to any real machine: system virtual machines, and process virtual machines.

"Means for executing a persistent hypervisor and a non-persistent hypervisor"—One or more processing units 404, system memory 406, and code for executing persistent hypervisor 110*a* and non-persistent hypervisor 110*b* according to any one (or combination of) each of their various embodiments described below, or any of each of their structural equivalents.

"Means for executing a handler engine"—One or more processing units 404, system memory 406, and code for executing handler engine 210 according to any one (or combination of) each of their various embodiments described below, or any of each of their structural equivalents.

II. Description of the Preferred Embodiments

Aspects of the invention are directed to a computing solution facilitating the persistent operation of one of the hypervisors in a computer system if other hypervisors are also present, where those other hypervisors operate periodically in the same processor core. In the present context, persistence of a hypervisor means that the hypervisor, in its ordinary course of operation, is expected to be executed as an active, ongoing process of the operating system or other essential program. This persistent operating regime differs from a periodic, or non-persistent regime in which a hypervisor is used occasionally for a specific task, after the conclusion of which the periodic hypervisor can be shut down while the persistent hypervisor remains running.

An example of persistent hypervisor 110*a* can be a hypervisor requiring ongoing execution of critically-important virtual machines, or a hypervisor required for ensuring the execution of a number of security-related operations such as antivirus processes. Examples of the non-persistent hypervisors 110*b* can be virtual machine dispatchers, also referred to as virtual machine monitors (VMMs) such as those produced by VMWare Corporation of Palo Alto, Calif., VirtualBox by Oracle Corporation of Redwood City, Calif., and Xen by Citrix Systems Incorporated of Fort Lauderdale, Fla.

Persistent hypervisor 110*a* will generally execute at a higher privilege level than any non-persistent hypervisor 110*b*. For instance, in modern processors that support a protection ring having a higher privilege level than even the operating system, hypervisor 110*a* would execute at that higher privilege level (e.g., protection ring −1, i.e., "hypervisor mode"), whereas non-persistent hypervisor 110*b* would execute at the privilege level of the operating system (e.g., protection ring 0, i.e., "supervisor mode").

A computing system according to aspects of the invention includes various engines, each of which is constructed, programmed, configured, or otherwise adapted, to autonomously carry out a function or set of functions. The term engine as used herein means a real-world device, component, or arrangement of components implemented using hardware, such as by an application specific integrated circuit (ASIC) or field-programmable gate array (FPGA), for example, or as a combination of hardware and software, such as by a microprocessor system and a set of program instructions that adapt the engine to implement the particular autonomous functionality, which (while being executed) transform the microprocessor system into a special-purpose machine. An engine can also be implemented as a combination of the two, with certain functions facilitated by hardware alone, and other functions facilitated by a combination of hardware and software. In certain implementations, at least a portion, and in some cases, all, of an engine can be implemented using the processor(s) of one or more computers that execute an operating system, system programs, and application programs, while also implementing the engine (and thereby becoming a special-purpose machine). Each engine can be physically realized in any of a variety of suitable physical and logical configurations, and should generally not be limited to any particular implementation exemplified herein, unless such limitations are expressly called out. In addition, an engine can itself be composed of more than one sub-engines, each of which can be regarded as an engine in its own right. Moreover, in the embodiments described herein, each of the various engines corresponds to a defined functionality; however, it should be understood that in other contemplated embodiments, each functionality may be distributed to more than one engine. Likewise, in other contemplated embodiments, multiple defined functionalities may be implemented by a single engine that performs those multiple functions, possibly alongside other functions, or distributed differently among a set of engines than specifically illustrated in the examples herein.

FIG. 1 is a diagram illustrating a portion of a conventional operating system (OS) 10, on which a plurality of hypervisors operate—for example, hypervisor 110*a*, which runs persistently, and the other hypervisors 110*b* (of which there can be more than one). In the case of conventional operation of the hypervisors 110*a* and 110*b*, a conventional task scheduler 120 will allocate each of the hypervisors a time for execution. For example, in a Windows OS, the scheduler 120 manages multitasking control by priorities, which means first-priority execution of higher-priority threads. Consequently, within an OS 10, where a scheduler 120 is used, it is impossible to ensure persistent operation of the hypervisor 110*a*, even if a higher priority is assigned to it, because, sooner or later, the scheduler 120 will allocate a time quantum for the execution of the code of the hypervisor 110*b*. In the present context, execution of one of the hypervisors 110*b* essentially means execution of virtual machines which operate under those hypervisors.

In various embodiments, hypervisors 110*a*, 110*b*, as well as task scheduler 120, are each physically realized as an engine that includes relevant portions of the computing platform, i.e., hardware, in combination with all of the necessary firmware or software components, e.g., relevant parts of the computer system's basic input/output system, operating system, device drivers, libraries, and other program instructions that are stored in the computing platform's storage media and executable on the computer system's processor(s).

It should be noted that the persistent hypervisor 110*a* can become needed during the execution of anti-virus operations for several reasons. Firstly, a hypervisor can allow detection of the execution of malicious code at the OS-core (supervisor mode, ring 0) level (for example, rootkits). Secondly, a hypervisor can be needed to bypass OS-core protection, such as PatchGuard. In a multi-core processor, a separate copy of the hypervisor will operate in each core, but with different corresponding contexts.

Figure 2A:
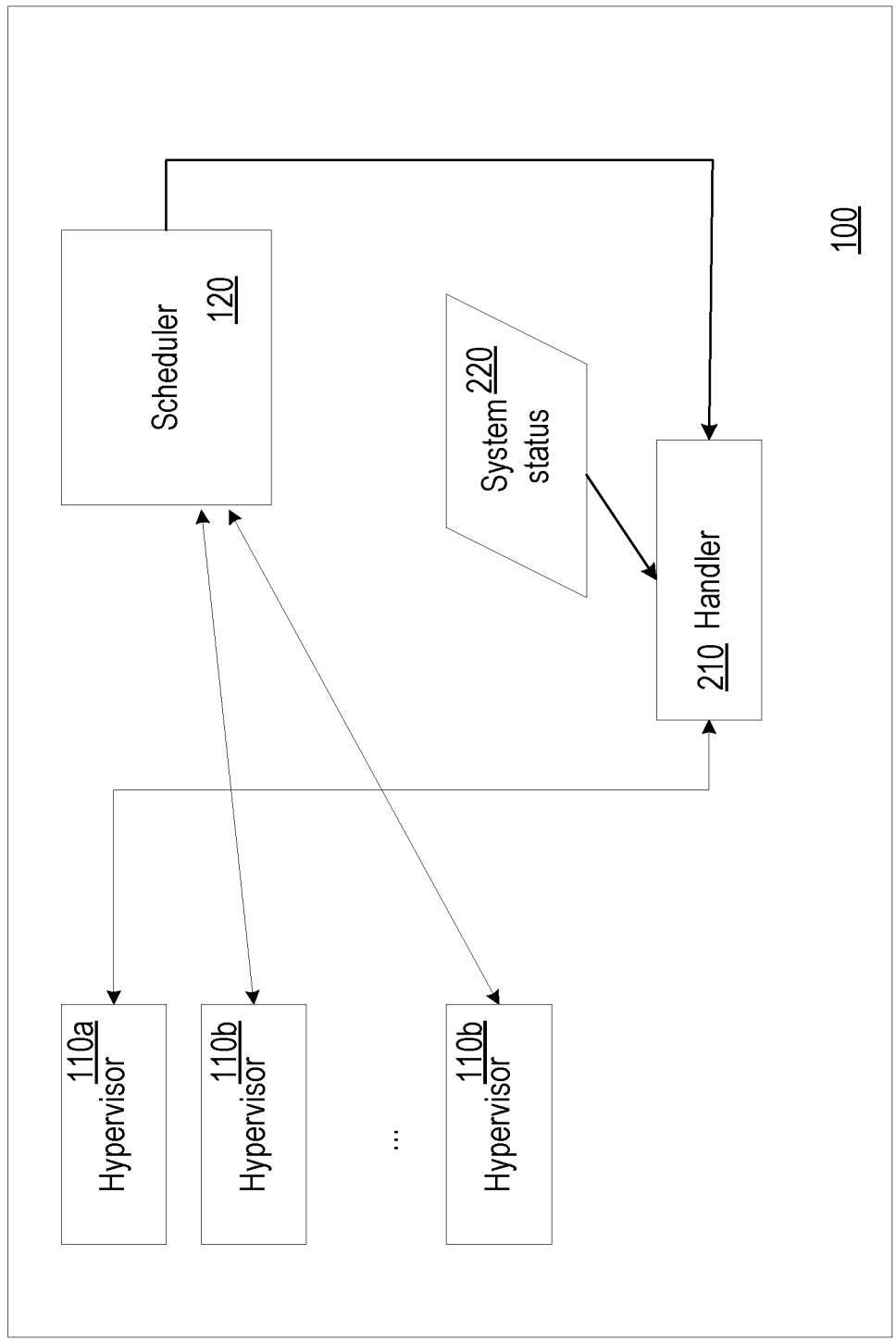
FIG. 2A is a diagram illustrating a system for ensuring the execution of multiple hypervisors in a system according to one embodiment.

FIG. 2A illustrates a system for ensuring the execution of multiple hypervisors in a system according to one embodiment. As illustrated, an operating system 100 hosts persistent hypervisor 110a, but in this embodiment, persistent hypervisor 110a is not controlled by the scheduler 120 (unlike the hypervisors 110b), but is controlled by a handler 210, which tracks the status information 220 of the system. Handler 210, in various embodiments, is physically implemented as an engine that includes the computing hardware and corresponding software components. In a related embodiment, handler 210 is further implemented using a specialized OS driver executed on the computing hardware.

In general, when any hypervisor 110b attempts to start executing its code when the processor is in hypervisor mode (protection ring −1), a change of the processor's operating mode occurs first, because during this time, commands will be executed which are responsible for the preparation of the subsequent launch of the virtual machine. For example, the Page Directory and the CR3 registry are entirely re-loaded. Another example of the launch of a virtual machine 110b is execution of the vmrun command (in the case of VMWare). Any of these parameters and commands are represented collectively in FIG. 2A as status information 220 of the system.

The handler 210 tracks the making of any modification to the specified parameters, or the execution of the commands (by intercepting them) to detect a need to execute the corresponding hypervisor 110b. Accordingly, handler 210 will stop the execution of the persistent hypervisor 110a.

Figure 2B:
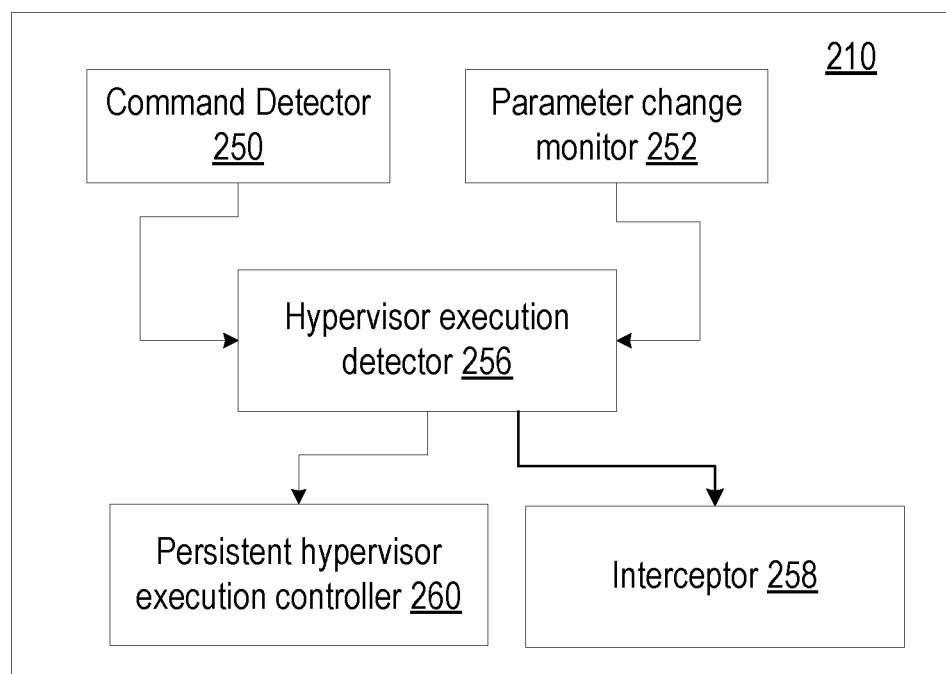
FIG. 2B is a block diagram illustrating an exemplary architecture of a handler engine according to one embodiment.

FIG. 2B is a block diagram illustrating an exemplary architecture of handler engine 210 according to one embodiment. Command detector engine 250 and parameter change monitor engine 252 are each programmed, or otherwise configured, to monitor status information 220 of the system. Command detector engine detects commands, whereas parameter change monitor 252 detects changes to certain parameters in the operating system. Hypervisor execution detector 256 compares the detected commands and changes in parameters against criteria indicating a call for execution of hypervisors 110b, or suitability of resuming operation of persistent hypervisor 110a. Such criteria can include changes in the state of the processor, re-loading of the Page Directory or CR3 registry, or an occurrence of a vmrun command. In a related embodiment, interceptor engine 258 is programmed, or otherwise configured, in response to detecting of an occurrence of a command or parameter change indicative of an attempted mode transition, to hold up the execution of that command or the mode transition until a specific series of actions is taken. Persistent hypervisor execution controller engine 260 is programmed, or otherwise configured, to take such actions, as described in detail below.

The following is a more detailed discussion of the process of activation and deactivation of the persistent hypervisor 110a by persistent hypervisor execution controller engine 260 in coordination with the other engines that make up handler 210 in accordance with one embodiment. This process includes the following actions:

a. preservation of the prior state of the processor (i.e. the last moment of execution of the code of one of the hypervisors 110b in hypervisor mode, i.e., protection ring −1);
b. execution of the code of the persistent hypervisor 110a in a different mode, e.g., supervisor mode (protection ring 0);
c. determination of an attempt to execute the code of any of hypervisors 110b;
d. restoration of the prior state of the processor for correct handling of the instruction for activation of virtualization by the hypervisor 110b;
e. exit from the hypervisor mode and transfer of control to the last instruction of hypervisor 110a in supervisor mode prior to execution of the code of hypervisor 110b. This operation ensures that persistent hypervisor 110a is taken out of hypervisor mode and into supervisor mode so that, when hypervisor 110b is executed in hypervisor mode hypervisor 110b remains unaware of persistent hypervisor 110a.

Therefore, the next instruction of the thread of the persistent hypervisor 110a is already executed outside the hypervisor mode, because continued execution is already carried out within the purview of a different protection ring (generally, it would be ring 0 corresponding to the privilege level of the kernel).

Figure 3:
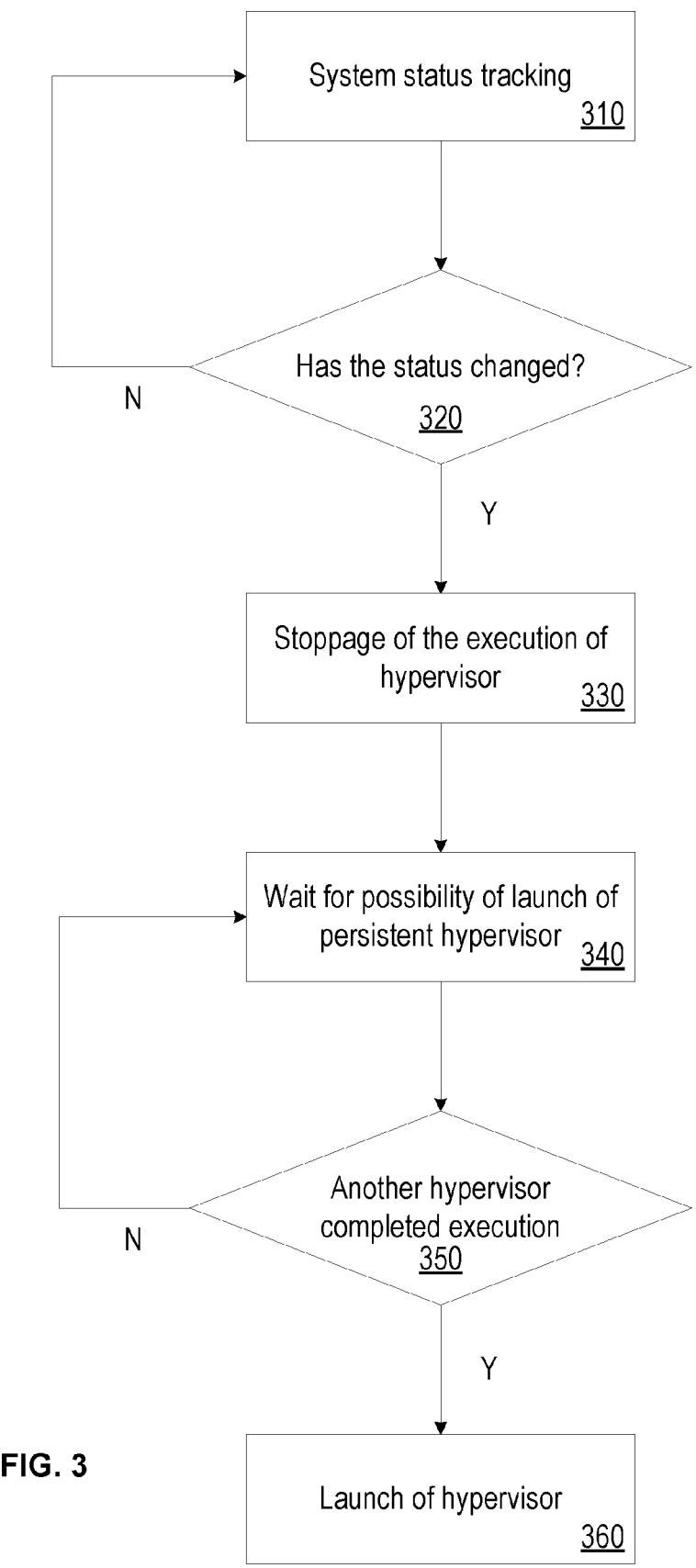
FIG. 3 illustrates a process of operation of the system illustrated in FIGS. 2A-2B according to one embodiment.

FIG. 3 illustrates a process of operation according to one embodiment. At 310, handler 210 (using command detector 250 and parameter change monitor 252) tracks the status information 220 of the system. If, at 320, hypervisor execution detector engine 256 determines that the status of the system has changed (for example, the pages directory is over-written or the vmrun command has been run), then, at 330, the execution of the persistent hypervisor 110a is stopped by persistent hypervisor execution controller 260.

In a related embodiment, at 320, an additional check is performed by hypervisor execution detector engine 256, namely, determining the processor mode from which the re-loading of the CR3 registry was called. If the registry re-load was called from the kernel mode, it is deemed to be merely a switch of context, and if it was called from the user mode, it is possible to additionally check that this was, for example, a call from the virtual machine's process. Such a check allows the system to minimize the number of "false activations" in case of stoppage of the persistent hypervisor 110a, in order to avoid stopping it without absolute necessity.

At 340, hypervisor execution detector engine 256 checks for the suitability of resuming the persistent hypervisor 110a. This action can respond to one or more of the following conditions:

the execution time quantum allocated by the scheduler 120 for the execution of one of the hypervisors 110b has expired;
a change in the status of the system 120 has occurred;
the handler 210 tracks the execution of the hypervisor 110b and receives a notification about the end of its operation (for example, through an official Application Programmable Interface, or API, provided by the developer of the hypervisor).

If, at 350, it was determined that one of the hypervisors 110b has completed execution (by checking the conditions such as those identified above), then, at 360, persistent hypervisor 110a is resumed by persistent hypervisor execution controller 260. In a related embodiment, where there are multiple distinct hypervisors 110b, prior to resumption of persistent hypervisor 110a immediately after the completion of the execution of a first hypervisor 110b, persistent hypervisor 110a waits for all hypervisors 110b to complete their execution before resuming execution.

In one embodiment, the resumption of operation of persistent hypervisor 110a is performed using a timer procedure (for example, in a Windows OS, this can be done using a KeSetTimer call). For example, upon expiry of a specified time (when the execution time quantum has expired), the scheduler 120 determines which code must be executed (for example, the start of the persistent hypervisor 110a). The timer can be reset in order to allow subsequent launch next time that one of the hypervisors 110b completes its operation and the persistent hypervisor 110a can be launched.

Another example of when the persistent hypervisor 110a should be stopped concerns a power-related change in the status information 220 of the system, for example, when going to the "hibernate" mode. For this purpose, functions related to power (Power Management event callback functions in a Windows OS) or system variables (SYSTEM_POWER_STATE in a Windows OS) are tracked.

Another example of the need to stop a persistent hypervisor 110a is the launch of a piece of code that also results in a significant change in the state of the processor, for example, emulators (such as QEMU (Quick Emulator) and other similar programs, including those used in antivirus applications). But if an emulator and the persistent hypervisor 110a are included in an antivirus product, then, after the operation of the emulator, the latter can automatically launch the persistent hypervisor 110a.

Figure 4:
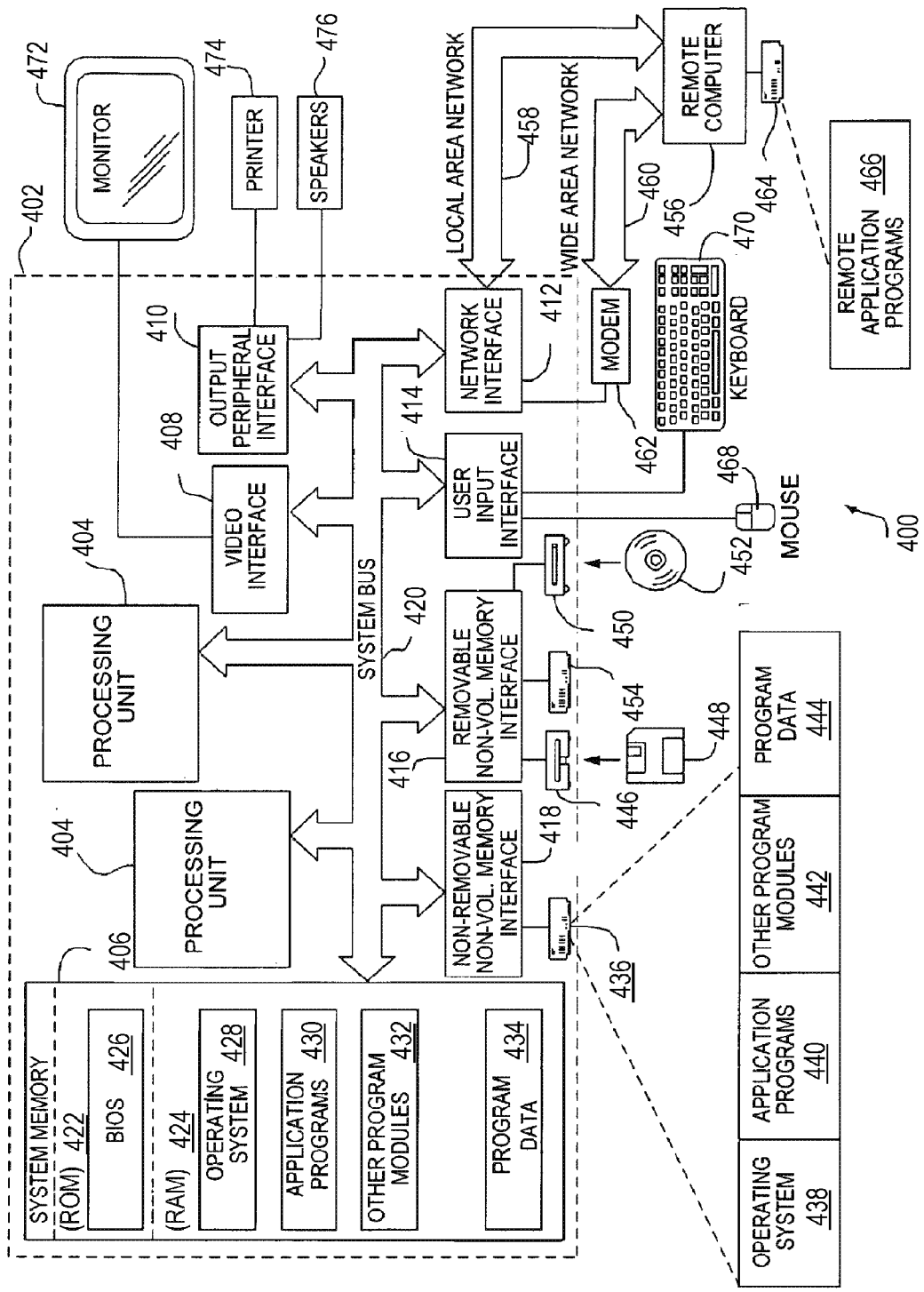
FIG. 4 is a diagram illustrating a computer system that is made into a special-purpose machine with improved functionality upon implementation of aspects of the invention.

FIG. 4 is a diagram illustrating in greater detail a computer system 400, that is made into a special-purpose machine with improved functionality upon implementation of aspects of the invention as described herein. The computer system 400 may include a computing device such as a personal computer 402. The personal computer 402 includes one or more processing units 404, a system memory 406, a video interface 408, an output peripheral interface 410, a network interface 412, a user input interface 414, removable 416 and non-removable 418 memory interfaces and a system bus or high-speed communications channel 420 coupling the various components. In various embodiments, the processing units 404 may have multiple logical cores that are able to process information stored on computer readable media such as the system memory 406 or memory attached to the removable 416 and non-removable 418 memory interfaces 418. The computer 402 system memory 406 may include non-volatile memory such as Read Only Memory (ROM) 422 or volatile memory such as Random Access Memory (RAM) 424. The ROM 422 may include a basic input/output system (BIOS) 426 to help communicate with the other portion of the computer 402. The RAM 424 may store portions of various software applications such as the operating system 428, application programs 430 and other program engines 432. Further, the RAM 424 may store other information such as program or application data 434. In various embodiments, the RAM 424 stores information that requires low-latencies and efficient access, such as programs and data being manipulated or operated on. In various embodiments RAM 424 comprises Double Data Rate (DDR) memory, Error Correcting memory (ECC) or other memory technologies with varying latencies and configurations such as RAMBUS or DDR2 and DDR3. In this way, in various embodiments, the system memory 406 may store the input data store, access credential data store, operating memory data store, instruction set data store, analysis result data store and the operating memory data store. Further, in various embodiments, the processing units 404 may be configured to execute instructions that limit access to the aforementioned data stores by requiring access credential before access to the information is granted.

The removable 416 and non-removable 418 memory interfaces may couple the computer 402 to disk drives 436 such as SSD or rotational disk drives. These disk drives 436 may provide further storage for various software applications such as the operating system 438, application programs 440 and other program engines 442. Further, the disk drives 436 may store other information such as program or application data 444. In various embodiments, the disk drives 436 store information that doesn't require the same low-latencies as in other storage mediums. Further, the operating system 438, application program 440 data, program engines 442 and program or application data 444 may be the same information as that stored in the RAM 424 in various embodiments mentioned above or it may be different data potentially derivative of the RAM 424 stored data.

Further, the removable non-volatile memory interface 416 may couple the computer 402 to magnetic portable disk drives 446 that utilize magnetic media such as the floppy disk 448, Iomega® Zip or Jazz, or optical disk drives 450 that utilize optical media 452 for storage of computer readable media such as Blu-Ray®, DVD-R/RW, CD-R/RW and other similar formats. Still other embodiments utilize SSD or rotational disks housed in portable enclosures 54 to increase the capacity of removable memory.

The computer 402 may utilize the network interface 412 to communicate with one or more remote computers 456 over a local area network (LAN) 458 or a wide area network (WAN) 460. The network interface 412 may utilize a Network Interface Card (NIC) or other interface such as a modem 462 to enable communication. The modem 462 may enable communication over telephone lines, coaxial, fiber optic, powerline, or wirelessly. The remote computer 456 may contain a similar hardware and software configuration or may have a memory 464 that contains remote application programs 466 that may provide additional computer readable instructions to the computer 402. In various embodiments, the remote computer memory 464 can be utilized to store information such as identified file information that may be later downloaded to local system memory 406. Further, in various embodiments the remote computer 456 may be an application server, an administrative server, client computers, or a network appliance.

A user may enter information to the computer 402 using input devices connected to the user input interface 414 such as a mouse 468 and keyboard 470. Additionally, the input device may be a trackpad, fingerprint scanner, joystick, barcode scanner, media scanner or the like. The video interface 408 may provide visual information to a display such as a monitor 472. The video interface 408 may be an embedded interface or it may be a discrete interface. Further, the computer may utilize a plurality of video interfaces 408, network interfaces 412 and removable 416 and non-removable 418 interfaces in order to increase the flexibility in operation of the computer 402. Further, various embodiments utilize several monitors 472 and several video interfaces 408 to vary the performance and capabilities of the computer 402. Other computer interfaces may be included in computer 402 such as the output peripheral interface 410. This interface may be coupled to a printer 474 or speakers 476 or other peripherals to provide additional functionality to the computer 402.

Various alternative configurations and implementations of the computer 402 are within the spirit of the invention. These variations may include, without limitation, additional interfaces coupled to the system bus 420 such as universal serial bus (USB), printer port, game port, PCI bus, PCI Express or integrations of the various components described above into chipset components such as the northbridge or southbridge. For example, in various embodiments, the processing unit 404 may include an embedded memory controller (not shown) to enable more efficient transfer of data from the system memory 406 than the system bus 420 may provide.

The embodiments above are intended to be illustrative and not limiting. Additional embodiments are within the claims. In addition, although aspects of the present invention have been described with reference to particular embodiments, those skilled in the art will recognize that changes can be made in form and detail without departing from the scope of the invention, as defined by the claims.

Persons of ordinary skill in the relevant arts will recognize that the invention may comprise fewer features than illustrated in any individual embodiment described above. The embodiments described herein are not meant to be an exhaustive presentation of the ways in which the various features of the invention may be combined. Accordingly, the embodiments are not mutually exclusive combinations of features; rather, the invention may comprise a combination of different individual features selected from different individual embodiments, as will be understood by persons of ordinary skill in the art.

Any incorporation by reference of documents above is limited such that no subject matter is incorporated that is contrary to the explicit disclosure herein. Any incorporation by reference of documents above is further limited such that no claims that are included in the documents are incorporated by reference into the claims of the present application. The claims of any of the documents are, however, incorporated as part of the disclosure herein, unless specifically excluded. Any incorporation by reference of documents above is yet further limited such that any definitions provided in the documents are not incorporated by reference herein unless expressly included herein.

For purposes of interpreting the claims for the present invention, it is expressly intended that the provisions of Section 112, sixth paragraph of 35 U.S.C. are not to be invoked unless the specific terms "means for" or "step for" are recited in a claim.

What is claimed is:

1. A system for coordinating joint operation of multiple hypervisors, the system comprising:
    a computing platform having a processor, data storage, and input/output facilities, the processor being switchable between a hypervisor mode and a supervisor mode, the hypervisor mode providing a higher privilege level than the supervisor mode, the computing platform containing instructions that, when executed by the computing platform, cause the computing platform to implement:
    a persistent hypervisor and a non-persistent hypervisor;
    a scheduler engine configured to coordinate operation of the non-persistent hypervisor in the supervisor mode;
    a handler engine configured to coordinate operation of the persistent hypervisor in the hypervisor mode such that:
        the handler engine monitors, and responds, to an attempted mode transition of the processor between the hypervisor and supervisor modes;
        in response to an attempted mode transition from the hypervisor mode to the supervisor mode, the handler engine suspends execution of the persistent hypervisor, including saving of a state of the processor, and transitions the processor to execute the non-persistent hypervisor in the supervisor mode, wherein the handler engine is configured to monitor by a command detector engine at least one command associated with a processor mode transition between the hypervisor mode and the supervisor mode; and
        wherein in response to a conclusion of execution of supervisor-mode instruction based on at least the at least one command associated with the processor mode transition monitored by the command detector engine, the handler engine suspends execution of the non-persistent hypervisor, including saving of the processor state, and transitions the processor to execute the persistent hypervisor in the hypervisor mode.

2. The system of claim 1, wherein the handler engine is realized using an operating system driver.

3. The system of claim 1, wherein the handler engine is configured to monitor status information of the computing platform indicative of a processor mode transition between the hypervisor mode and the supervisor mode.

4. The system of claim 1, wherein the at least one command includes a vmrun command.

5. The system of claim 1, wherein the handler engine is configured to detect at least one parameter state change associated with a processor mode transition between the hypervisor mode and the supervisor mode.

6. The system of claim 5, wherein the parameter state change includes re-loading of a pages directory.

7. The system of claim 5, wherein the parameter state change includes re-loading of a CR3 registry.

8. The system of claim 1, wherein the handler engine includes an interceptor engine configured to suspend execution of a processor mode change, in response to a detection of an attempt to made such a mode change, until a series of actions for controlling operation of the persistent hypervisor is completed.

9. The system of claim 1, wherein the handler engine is configured such that, in response to an attempted mode transition from the hypervisor mode to the supervisor mode, the handler engine determines a processor mode in which the mode transition was originated and, based on the determination of that processor mode, suspension of the persistent hypervisor is either permitted, or not permitted.

10. The system of claim 1, wherein the handler engine is configured to monitor the scheduler engine for a condition indicating a call to stop execution of a non-persistent hypervisor and, in response to the condition, the handler engine resumes operation of a suspended persistent hypervisor.

11. A method for coordinating joint operation of multiple hypervisors in a computing system having a processor that is switchable between a hypervisor mode and a supervisor mode, the hypervisor mode providing a higher privilege level than the supervisor mode, the method comprising:
    executing, by the computing system, a persistent hypervisor and a non-persistent hypervisor, the non-persistent hypervisor being executed in the supervisor mode according to an operating regime controlled by a scheduler engine;
    executing, by the computing system, a handler engine to coordinate operation of the persistent hypervisor in the hypervisor mode such that:
        the handler engine monitors, and responds, to an attempted mode transition of the processor between the hypervisor and supervisor modes;
        in response to an attempted mode transition from the hypervisor mode to the supervisor mode, the handler engine suspends execution of the persistent hypervisor, including saving of a state of the processor, and transitions the processor to execute the non-persistent hypervisor in the supervisor mode, wherein the handler engine detects by a parameter change monitor engine at least one parameter state change associated with a processor mode transition between the hypervisor mode and the supervisor mode; and wherein in response to a conclusion of execution of supervisor-mode instruction based on at least the at least one parameter state change associated with the processor mode transition detected by the parameter change monitor engine, the handler engine suspends execution of the non-persistent hypervisor, including saving of the processor state, and transitions the processor to execute the persistent hypervisor in the hypervisor mode.

12. The method of claim 11, wherein the handler engine monitors status information of the computing platform indicative of a processor mode transition between the hypervisor mode and the supervisor mode.

13. The method of claim 11, wherein the handler engine monitors at least one command associated with a processor mode transition between the hypervisor mode and the supervisor mode.

14. The method of claim 13, wherein the at least one command includes a vmrun command.

15. The method of claim 11, wherein the parameter state change includes reloading of a pages directory or of a CR3 registry.

16. The method of claim 11, wherein the handler engine suspends execution of a processor mode change, in response to a detection of an attempt to made such a mode change, until a series of actions for controlling operation of the persistent hypervisor is completed.

17. The method of claim 11, wherein in response to an attempted mode transition from the hypervisor mode to the supervisor mode, the handler engine determines a processor mode in which the mode transition was originated and, based on the determination of that processor mode, suspension of the persistent hypervisor is either permitted, or not permitted.

18. The method of claim 11, wherein the handler engine monitors the scheduler engine for a condition indicating a call to stop execution of a non-persistent hypervisor and, in response to the condition, the handler engine resumes operation of a suspended persistent hypervisor.

19. A system for coordinating joint operation of multiple hypervisors in a computing system having a processor that is switchable between a hypervisor mode and a supervisor mode, the hypervisor mode providing a higher privilege level than the supervisor mode, the system comprising:

means for executing a persistent hypervisor and a non-persistent hypervisor, the non-persistent hypervisor being executed in the supervisor mode according to an operating regime controlled by a scheduler engine;

means for executing a handler engine to coordinate operation of the persistent hypervisor in the hypervisor mode such that:

the handler engine monitors, and responds, to an attempted mode transition of the processor between the hypervisor and supervisor modes;

in response to an attempted mode transition from the hypervisor mode to the supervisor mode, the handler engine suspends execution of the persistent hypervisor, including saving of a state of the processor, and transitions the processor to execute the non-persistent hypervisor in the supervisor mode, wherein the handler engine is configured to monitor by a command detector engine at least one command associated with a processor mode transition between the hypervisor mode and the supervisor mode; and wherein in response to a conclusion of execution of supervisor-mode instruction based on at least the at least one command associated with the processor mode transition monitored by the command detector engine, the handler engine suspends execution of the non-persistent hypervisor, including saving of the processor state, and transitions the processor to execute the persistent hypervisor in the hypervisor mode.

* * * * *